United States Patent [19]

Durfee, Jr.

[11] Patent Number: 4,993,167
[45] Date of Patent: Feb. 19, 1991

[54] DRESSING TOOL GAUGE FOR POSITIONING CUTTING TOOLS IN REMOVABLE HEAD TYPE DRESSERS

[75] Inventor: David L. Durfee, Jr., Meadville, Pa.

[73] Assignee: Susan M. Durfee, Meadville, Pa.

[21] Appl. No.: 332,153

[22] Filed: Apr. 3, 1989

[51] Int. Cl.$^5$ .............................................. B27G 23/00
[52] U.S. Cl. ....................................... 33/626; 33/628;
33/712; 33/821
[58] Field of Search ................. 33/626, 628, 710, 712,
33/821, 823, 832, 833, 836, 813, 815, 825, 826,
828, 830, 831, 502

[56] References Cited

U.S. PATENT DOCUMENTS

| | | | |
|---|---|---|---|
| 756,461 | 4/1904 | Borduas | 33/815 |
| 2,590,922 | 4/1952 | Blewett et al. | 33/813 |
| 2,835,040 | 5/1958 | D'Elia | 33/813 |
| 3,170,242 | 2/1965 | Deittrick et al. | 33/626 |
| 3,496,758 | 2/1970 | Sunnen | 33/828 |
| 3,535,794 | 10/1970 | Singer | 33/828 |
| 4,571,841 | 2/1986 | Campbell | 33/628 |
| 4,630,378 | 12/1986 | Kulp et al. | 33/628 |
| 4,662,075 | 5/1987 | Mastel et al. | 33/628 |

Primary Examiner—William A. Cuchlinski
Assistant Examiner—C. W. Fulton
Attorney, Agent, or Firm—Wayne L. Lovercheck;
Charles L. Lovercheck; Dale Lovercheck

[57] ABSTRACT

A dressing tool gauge for positioning the cutting tool in removable head type dresser devices for grinding wheels. The dressing tool gauge will indicate the proper position for the cutting tool to dress a predetermined shape on the grinding wheel. A member is placed at the position and the cutting tool is slid into engagement with the member. The cutting tool may then be secured in its holder in that position and placed on the dresser device to be used.

16 Claims, 4 Drawing Sheets

DRESSING TOOL GAUGE FOR POSITIONING CUTTING TOOLS IN REMOVABLE HEAD TYPE DRESSERS

FIELD OF THE INVENTION

This invention relates to a device to set or position a cutting tool and particularly to set or position a cutting tool for use in a removable head type dressing device for grinding wheels.

Removable head type dressing devices for grinding wheels in which the head holds the cutting tool have an established center height or reference dimension which is the distance from the center line of the pivot or shaft of the dressing device to the reference surface of the removable head as it is supported on the offset arm that is rotated by the shaft of the dressing device. The removable head holds the adjustable cutting tool, which is usually a diamond for work of this type, but other kinds of cutting tools can be used for this purpose. By adding or subtracting the desired radius size to or from the reference dimension and setting the tool at that point, the tool is properly positioned so that the desired radius will be dressed on the grinding wheel. By adding to the reference dimension a determined or desired dimension is found at which a concave surface will be dressed on the wheel. By subtracting from the reference dimension a determined or desired dimension is found at which a convex surface will be dressed on the wheel.

In the prior art, the determined or desired dimension is found by taking the reference dimension and adding or subtracting the desired radius size therefrom. This resulting dimension is then established with a stack of gauge blocks which total the determined or desired dimension. To set or position the cutting tool gauge blocks in the determined amount are set on a surface plate. Then the head is removed from the dressing device and placed with the reference surface supported on the top of the stack of gauge blocks with the cutting tool extending downwardly toward the surface plate. The cutting tool is then released and moved downwardly until it extends the length of the gauge stack and touches the surface plate. The cutting tool is normally held in a dovetail shaped slot in the head that permits it to slide in a direction perpendicular to the reference surface of the head. When the cutting tool touches the surface plate with the head on top of the gauge blocks, the desired dimension is achieved and the cutting tool is tightened in place and the head is returned to the dressing device. Thus, the desired cutting tool position is set to dress the grinding wheel. This process must be followed repeatedly since cutting tool wear and diamond wear will cause a loss or gain of the desired dimension and thus a deviation from the desired surface. The gauge block stack is also subject to error resulting from foreign objects between the blocks and the use of an incorrect block resulting in the inaccurate determination of the position of the cutting tool. The existing gauge block stack method of measurement can be a very time consuming procedure when performed repeatedly to maintain the desired dimension to a close tolerance.

SHORT STATEMENT OF THE INVENTION

The present invention cures the above problems by providing a dresser gauge which provides a structure which will permit the fast and accurate positioning of the cutting tool which will permit quick, frequent and accurate positionings of the cutting tool without undue interruption of the dressing operation. The dresser gauge provides a positioning holder for the head whereby the head may be removed from the dressing device and quickly and accurately secured in position in the dresser gauge. The head is positioned so that the cutting tool and positioning device are aligned with each other. The positioning device has an end surface which is moved to the predetermined position. The end surface of the positioning device is movable through a range of positions which will permit the positioning of the cutting tool through a range of radius sizes that the dresser is intended to provide.

In one embodiment, the positioning device has a center point that is marked by "zero", the "zero" being the position of the reference dimension. The positioning device is then movable in either direction from the zero point to achieve the radius dimension desired.

In another embodiment the positioning device is marked off on a measuring scale, the reference dimension is determined by the particular dressing device being used since different radiuses of rotation may be encountered from dressing device to dressing device. From the reference dimension for the particular dressing device being used the desired radius is added or subtracted from that radius dimension to determine the position at which the cutting tool is to be set.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENTS

Figure 1:
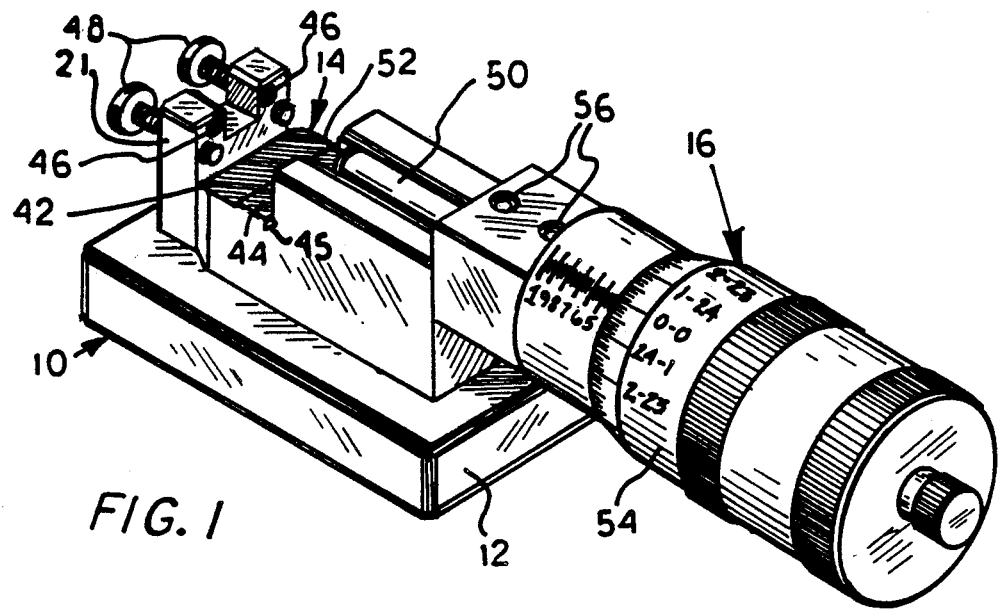
FIG. 1 is an overall view of one version of the dresser gauge of the present invention.

The preferred embodiment of the present invention is illustrated by way of example in FIGS. 1 through 5. With specific reference to FIGS. 1, 3 and 4, the dressing tool gauge 10 is shown comprising a base 12, which supports a holding means 14 and a positioning means 16. Holding means 14 has a cavity bounded by shoulder 21, datum surface 44 and bottom surface 42. Groove 45 is cut in bottom surface 42 of holding means 14 and undercut forming first hook 15. Groove 45 is complementary in shape to projection 27 on body 36. Projection 27 is undercut forming second hook 29 to be received in groove 45 of bottom surface 42 and in groove 23 of rotatable arm 24. Holding means 14 is adapted to support the removable head of a dressing device for grinding wheels. The cutting tool on the head is supported in axial relationship with positioning means 16 when it is supported in the holding means of the dressing tool gauge.

Figure 2:
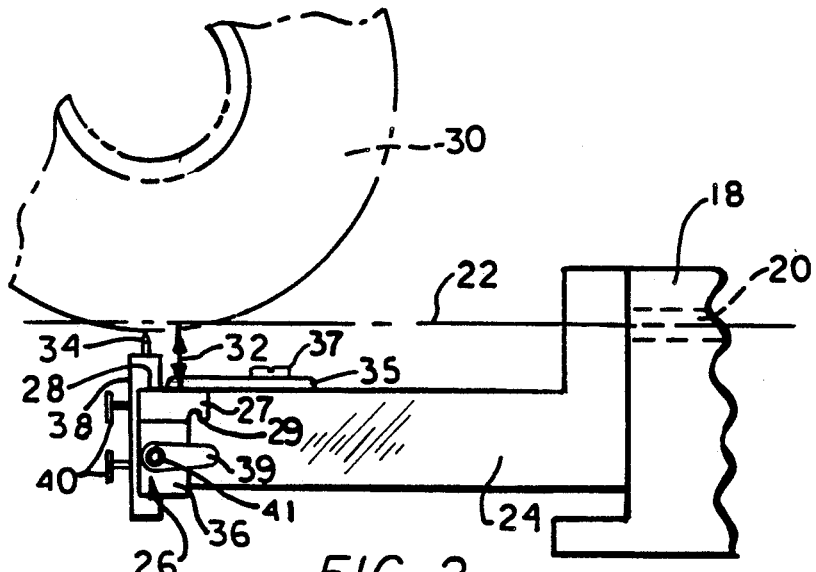
FIG. 2 is a side view of a portion of a dressing device for grinding wheels showing the rotatable arm which supports the head and cutting tool in relation to the grinding wheel to be dressed and showing the axis through the center of the rotating shaft.
Figure 3:
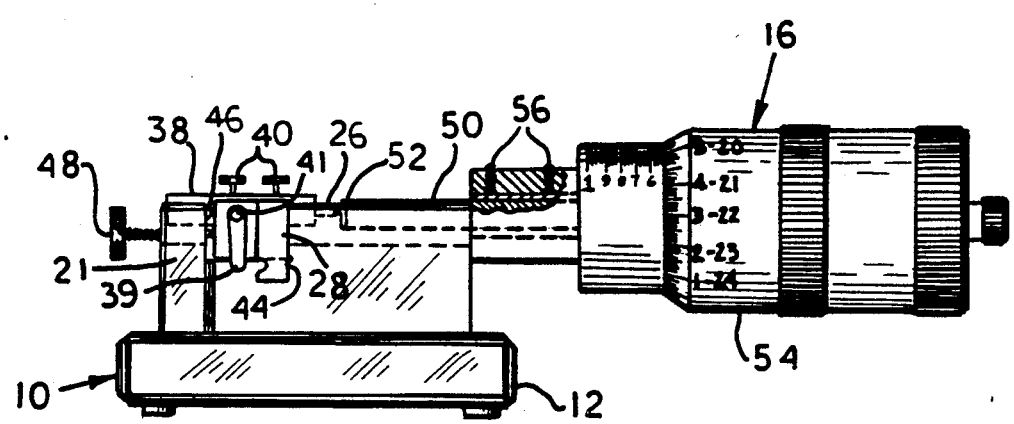
FIG. 3 is a side view of the dresser gauge with the head from the dressing device secured in position and the cutting tool being shown in engagement with the end surface of the positioning device.
Figure 4:
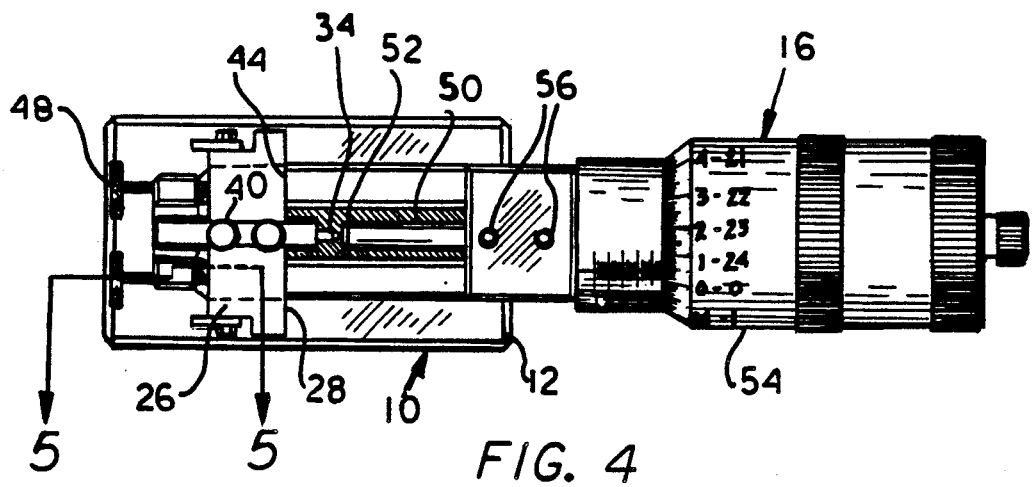
FIG. 4 is a top view of the dresser gauge with the head from the dressing device secured in position and the cutting tool being shown in engagement with the end surface of the positioning device.
Figure 5:
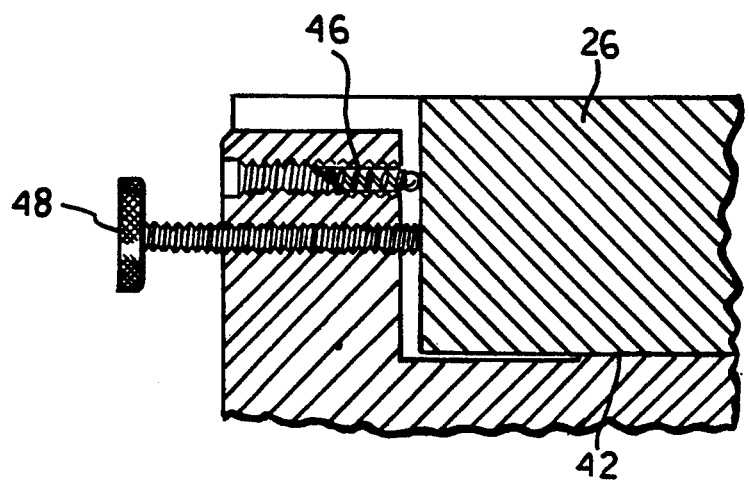
FIG. 5 is a cross sectional view taken on line 5—5 of FIG. 4 showing both spring loaded and threaded means being used to hold the head firmly against the datum surface of the dresser gauge; and, FIG. 6 is an enlarged view of the scale shown in part in FIGS. 1, 3 and 4.

Referring now to FIG. 2, dressing device 18 for grinding wheels is shown having shaft 20 supported in dressing device 18. Shaft 20 is rotatable about an axis 22. Shaft 20 is affixed to rotatable arm 24, which is offset a distance from but lies parallel to axis 22. Upwardly facing hook 31 on rotatable arm 24 interlocks with second hook 29. Base surface 25 of body 36 rests on front surface 33 of rotatable arm 24 when removable head 26 is supported on rotatable arm 24. Removable head 26 is held in place on rotatable arm 24 by first latch 35. Latch 35 is held in place by first screw 37 in rotatable arm 24. Latch 35 overlies removable head 26 and holds it in place. Second latch 39 is attached to removable head 26 by second screw 41 and holds removable head 26 against lateral movement on arm 24. Rotatable arm 24 supports removable head 26 which has reference surface 28 thereon. Reference surface 28 is the side of removable head 26 which faces grinding wheel 30 when the grinding wheel is being dressed. The distance from the reference surface 28 to the axis 22 is the reference dimension 32. Reference dimension 32 is the zero position for the cutting tool 34. In the zero position the cutting tool will be maintained at the same level as it is moved across the face of grinding wheel 30 by rotating of rotatable arm 24. By adding to the reference dimension and setting the tool at that point, the tool will dress a concave surface on the wheel. By subtracting from the reference dimension and setting the tool at that point a convex surface will be dressed on the wheel, when the cutting tool is moved across the face of the grinding wheel as the arm of the dressing device is rotated.

Removable head 26 consists of body 36, tool carrying member 38 which will ride a dovetail slot in body 36 and support the cutting tool in a position perpendicular to reference surface 28. Body 36 has base surface 25 generally perpendicular to reference surface 28 and rear surface 19 of body 36. Rotatable arm 24 extends from front surface 33 toward dressing device 18. Carrying member 38 has fastening devices 40 adapted to retain a cutting tool in a set position. When the head is supported in dressing tool gauge 10, the head is supported on bottom surface 42. Reference surface 28 is supported snugly against datum surface 44. As shown in greater detail in FIG. 5, head 26 is pushed into engagement with datum surface 44 by spring loaded securing means 46 and by threaded securing members 48.

Figure 6:
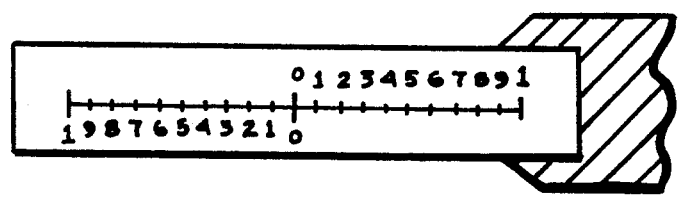
Figure 7:
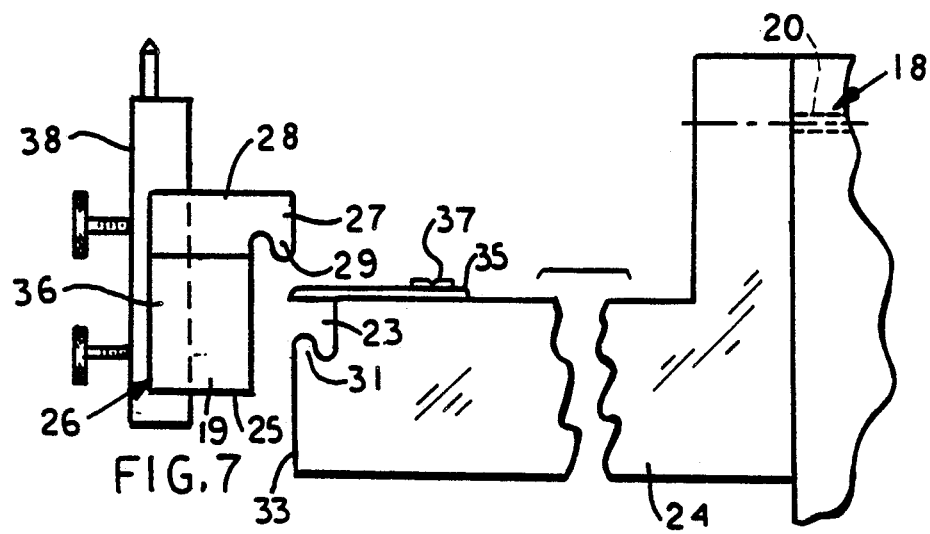
FIG. 7 is an exploded side view of FIG. 2.
Figure 8:
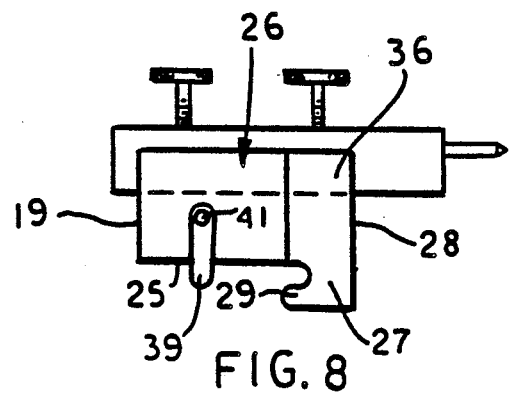
FIG. 8 is an enlarged side view of the head shown in FIGS. 2 and 3.
Figure 9:
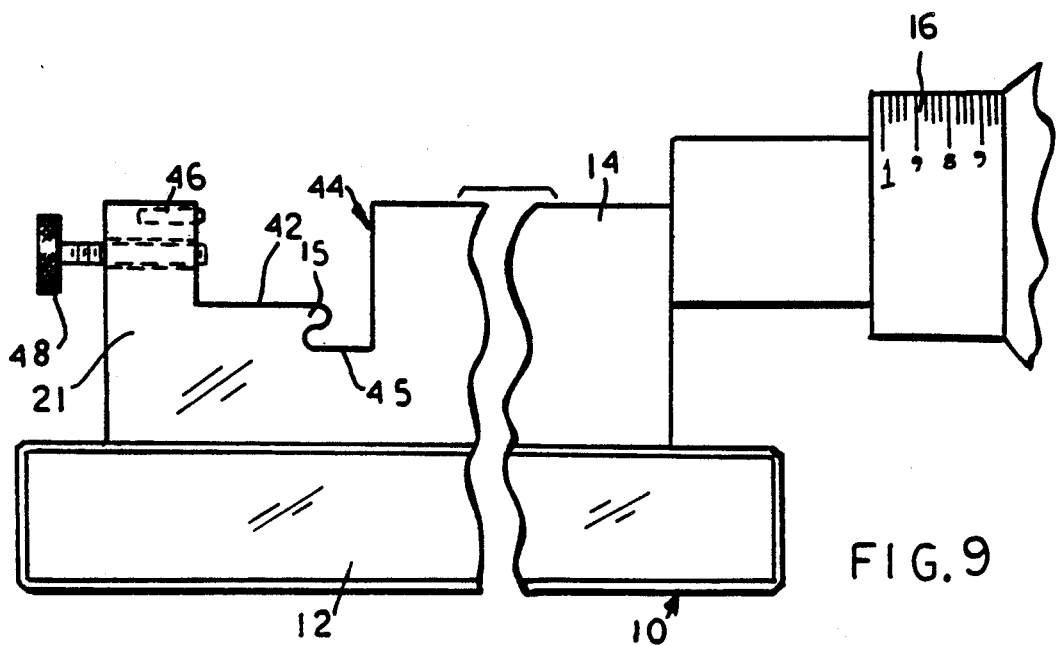
FIG. 9 is an enlarged side view of the gauge shown in FIG. 3.
Figure 7:
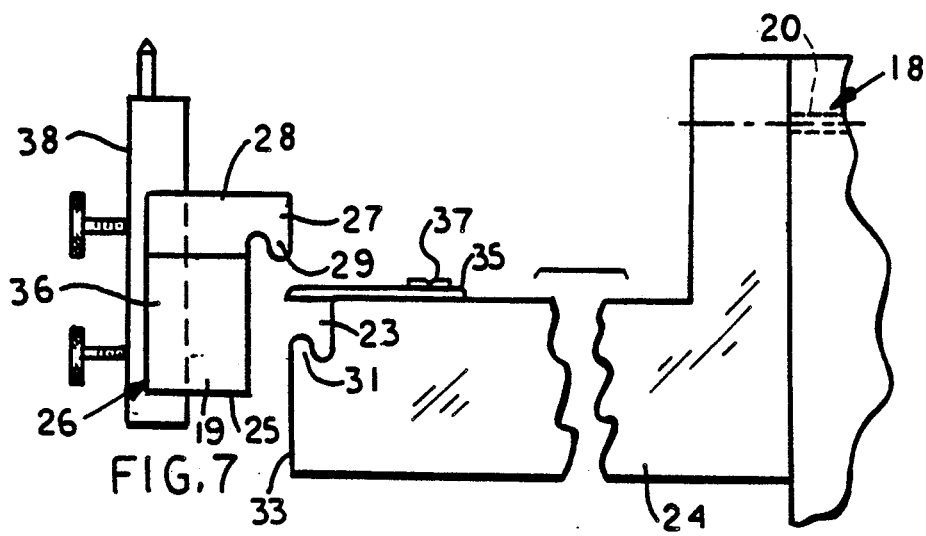
Figure 8:
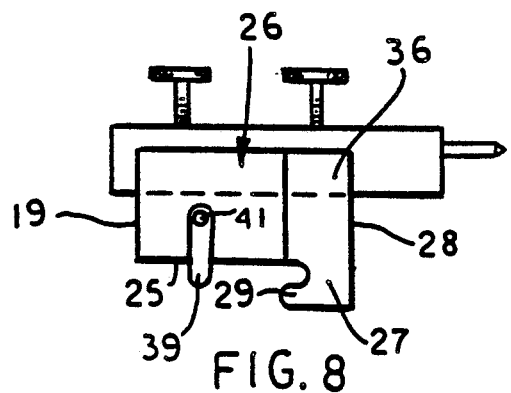
Figure 9:
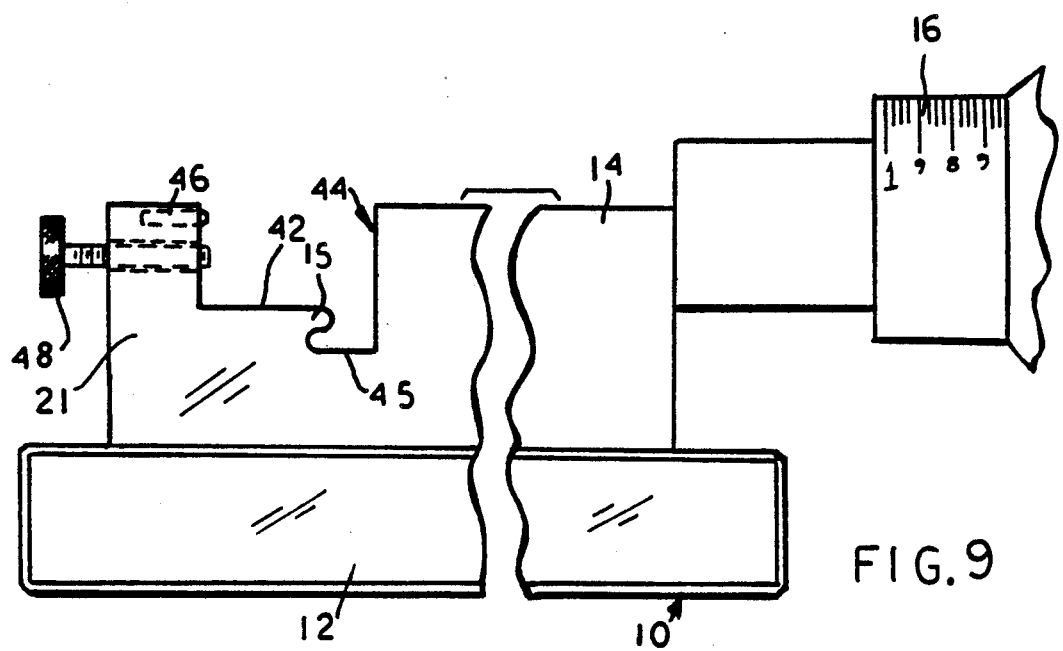

Positioning means 16 is made up of positioning member 50 and a measuring means 54. Positioning member 50 terminates at a first end in positioning surface 52 and a second end of the positioning member being attached to measuring means 54. Measuring means 54 may be a graduated micrometer screw supported on the base in alignment with the cutting tool position or other measuring device. The micrometer screw may have the positioning member affixed to an end thereof so that positioning the screw will position the positioning surface directly. The scale as shown in FIG. 6 increases from a central zero point to a distance of one inch on either side. The fine adjustment scale shown in FIGS. 1, 3 and 4 has 25 divisions and extends around the measuring instrument in both directions for use in both the plus and minus directions. By proper adjustment of measuring means 54, positioning surface 52 may be moved to a zero point which would set the cutting tool at the reference dimension. From this zero point, the positioning surface may be moved a measured amount either adding to or subtracting from the reference dimension to establish a concave or convex radius of predetermined amount for dressing the wheel. Set screws 56 may be loosened permitting the adjustment of the positioning member 50 to the appropriate zero point which is determined by the particular reference dimension 32 of the dressing device 18.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A dresser gauge for positioning an adjustable cutting tool on a removable head type dressing device which comprises:
   a holding means
   said holding means having a cavity in said holding means defined by a bottom surface, a datum surface and a shoulder,
   said cavity being adapted to receive said removable head,
   said datum surface lying in a first plane,
   said datum surface being disposed generally perpendicular to said bottom surface,
   said shoulder having engaging means adapted to engage a rear surface on said removable head to hold a reference surface of said removable head of said dressing device against said datum surface of said holding means,
   a cutting tool positioning device supported on said removable head extending along an axis perpendicular to said first plane and having an end surface lying in a second plane parallel to said first plane,
   said end surface being movable through a suitable range of positions,
   said cutting tool positioning device being movable to a desired position relative to said datum surface whereby said cutting tool may be moved into engagement with said end surface of said positioning device and fastening means on said head for holding a carrying tool member in place on said head to provide a predetermined shaped cut when said head is placed in said dressing device.

2. The dresser gauge recited in claim 1 wherein said cutting tool positioning device comprises:
   a positioning member having said end surface at a first end thereof,
   a second end of said positioning member being supported by a measuring means whereby a zero position can be determined and positions plus or minus zero can be determined.

3. The dresser gauge recited in claim 2 wherein said cutting tool positioning device comprises a threaded supporting member and a graduated micrometer screw movable in said supporting member whereby the distance said graduated micrometer screw is moved can be determined.

4. The dresser gauge recited in claim 3 wherein said graduated micrometer screw is graduated in increments of 0.0001 of an inch.

5. The dresser gauge recited in claim 3 wherein said positioning member is an integral part of said graduated micrometer screw.

6. The dresser gauge recited in claim 1 wherein said holding means comprises:

threaded members which can be tightened against said head to hold said front surface thereof in engagement with said datum surface.

7. The dresser gauge recited in claim 1 wherein said holding means comprises:

spring loaded members adapted to push against said head to hold said front surface thereof in engagement with said datum surface.

8. The dresser gauge recited in claim 1 wherein said cutting tool positioning device comprises a "zero" indicia at a point where said cutting tool would dress a flat surface.

9. A dresser gauge for positioning an adjustable cutting tool on a removable head of a dressing device, said head having a reference surface, a rear surface and a cutting tool extending from said reference surface in adjustable relation thereto, said gauge having a holding means, said holding means having a cavity therein defined by a datum surface, a bottom surface disposed generally perpendicular to said datum surface and a securing means supported on a shoulder, said securing means being adapted to hold said removable head of said dressing device against said datum surface, positioning means supported on said holding means having indicating means adapted to indicate the desired adjusted position for said cutting tool comprising a measuring means and a positioning surface whereby said cutting tool may be set in the position indicated by said positioning means and then secured in place on said head to provide a predetermined shaped cut when said head is placed in said dressing device.

10. The dresser gauge recited in claim 9 wherein said removable head is adapted to be supported on a wheel dressing machine having a grinding wheel with a periphery to be dressed and a rotatable arm supported adjacent said wheel, said rotatable arm having an upwardly facing hook, said removable head having a projection defining a downwardly facing hook adapted to be interconnected with said upwardly facing hook on said rotatable arm whereby said reference surface of said removable head is held at a predetermined distance from said periphery of said wheel and said cutting tool engages said periphery of said grinding wheel.

11. The dresser gauge recited in claim 9 wherein said positioning means extends along an axis in alignment with said cutting tool and said positioning means has a positioning surface lying in a plane perpendicular to said axis.

12. The dresser gauge recited in claim 9 wherein said holding means comprises:

threaded members which can be tightened against said head to hold said front surface thereof in engagement with said datum surface.

13. The dresser gauge recited in claim 9 wherein said cutting tool positioning device comprises a threaded supporting member and a graduated micrometer screw movable in said supporting member whereby the distance said graduated micrometer screw is moved can be determined.

14. The dresser gauge recited in claim 9 wherein said graduated micrometer screw is graduated in increments of 0.0001 of an inch.

15. The dresser gauge recited in claim 9 wherein said positioning member is an integral part of said graduated micrometer screw.

16. A method for positioning a cutting tool for use in a removable head type dressing device which comprises the steps of:

placing and holding a front surface of said removable head against a datum surface of a dresser gauge, adjusting an end surface of a cutting tool positioning device at a desired position for said cutting tool, moving said cutting tool into engagement with said end surface of said positioning device, securing said cutting tool in position on said removable head whereby said cutting tool will cut a predetermined shape when said removable head is placed in said dressing device.

* * * * *